US007277853B1

(12) United States Patent
Bou-Ghazale et al.

(10) Patent No.: US 7,277,853 B1
(45) Date of Patent: Oct. 2, 2007

(54) SYSTEM AND METHOD FOR A ENDPOINT DETECTION OF SPEECH FOR IMPROVED SPEECH RECOGNITION IN NOISY ENVIRONMENTS

(75) Inventors: Sahar E. Bou-Ghazale, Irvine, CA (US); Ayman O. Asadi, Laguna Niguel, CA (US); Khaled Assaleh, Mission Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 995 days.

(21) Appl. No.: 09/948,331

(22) Filed: Sep. 5, 2001

Related U.S. Application Data

(60) Provisional application No. 60/272,956, filed on Mar. 2, 2001.

(51) Int. Cl.
*G10L 17/00* (2006.01)

(52) U.S. Cl. ...................................... 704/248; 704/253

(58) Field of Classification Search ................ 704/233, 704/208, 210, 253, 226, 248, 242; 179/1; 381/46; 395/2.42
See application file for complete search history.

(56) References Cited

U.S. PATENT DOCUMENTS 4,821,325 A * 4/1989 Martin et al. ............... 704/253
4,868,879 A * 9/1989 Morito et al. ............... 704/248
5,293,588 A * 3/1994 Satoh et al. ................ 704/233
5,617,508 A * 4/1997 Reaves ........................ 704/233
5,794,195 A * 8/1998 Hormann et al. ........... 704/253
6,324,509 B1 * 11/2001 Bi et al. ...................... 704/248
6,381,570 B2 * 4/2002 Li et al. ...................... 704/233
6,449,594 B1 * 9/2002 Hwang et al. .............. 704/233
6,480,823 B1 * 11/2002 Zhao et al. ................. 704/226
2002/0120443 A1 * 8/2002 Epstein et al. .............. 704/233

* cited by examiner

*Primary Examiner*—W. R. Young
*Assistant Examiner*—Minerva Rivero
(74) *Attorney, Agent, or Firm*—Farjami & Farjami LLP

(57) ABSTRACT

According to a disclosed embodiment, an endpointer determines the background energy of a first portion of a speech signal, and a cepstral computing module extracts one or more features of the first portion. The endpointer calculates an average distance of the first portion based on the features. Subsequently, an energy computing module measures the energy of a second portion of the speech signal, and the cepstral computing module extracts one or more features of the second portion. Based on the features of the second portion, the endpointer calculates a distance of the second portion. Thereafter, the endpointer contrasts the energy of the second portion with the background energy of the first portion, and compares the distance of the second portion with the distance of the first portion. The second portion of the speech signal is classified by the endpointer as speech or non-speech based on the contrast and the comparison.

25 Claims, 7 Drawing Sheets

SYSTEM AND METHOD FOR A ENDPOINT DETECTION OF SPEECH FOR IMPROVED SPEECH RECOGNITION IN NOISY ENVIRONMENTS

RELATED APPLICATIONS

The present application claims the benefit of U.S. provisional application Ser. No. 60/272,956, filed Mar. 2, 2001, which is hereby fully incorporated by reference in the present application.

BACKGROUND OF THE INVENTION

1. Field of the Invention

The present invention relates generally to the field of speech recognition and, more particularly, speech recognition in noisy environments.

2. Related Art

Automatic speech recognition ("ASR") refers to the ability to convert speech signals into words, or put another way, the ability of a machine to recognize human voice. ASR systems are generally categorized into three types: speaker-independent ASR, speaker-dependent ASR and speaker-verification ASR. Speaker-independent ASR can recognize a group of words from any speaker and allow any speaker to use the available vocabularies after having been trained for a standard vocabulary. Speaker-dependent ASR, on the other hand, can identify a vocabulary of words from a specific speaker after having been trained for an individual user. Training usually requires the individual to say words or phrases one or more times to train the system. A typical application is voice dialing where a caller says a phrase such as "call home" or a name from the caller's directory and the phone number is dialed automatically. Speaker-verification ASR can identify a speaker's identity by matching the speaker's voice to a previously stored pattern. Typically, speaker-verification ASR allows the speaker to choose any word/phrase in any language as the speaker's verification word/phrase, i.e. spoken password. The speaker may select a verification word/phrase at the beginning of an enrollment procedure during which the speaker-verification ASR is trained and speaker parameters are generated. Once the speaker's identity is stored, the speaker-verification ASR is able to verify whether a claimant is whom he/she claims to be. Based on such verification, the speaker-verification ASR may grant or deny the claimant's access or request.

Detecting when actual speech activity contained in an input speech signal begins and ends is a basic problem for all ASR systems, and it is well-recognized that proper detection is crucial for good speech recognition accuracy. This detection process is referred to as endpointing. FIG. 1 shows a block diagram of a conventional energy-based endpointing system integrated widely in current speech recognition systems. Endpoint detection system 100 illustrated in FIG. 1 comprises endpointer 102, feature extraction module 104 and recognition system 106.

Continuing with FIG. 1, endpoint detection system 100 utilizes a conventional energy-based algorithm to determine whether an input speech signal, such as speech signal 101, contains actual speech activity. Endpoint detection system 100, which receives speech signal 101 on a frame-by-frame basis, determines the beginning and/or end of speech activity by processing each frame of speech signal 101 and measuring the energy of each frame. By comparing the measured energy of each frame against a preset threshold energy value, endpoint detection system 100 determines whether an input frame has a sufficient energy value to classify as speech. The determination is based on a comparison of the energy value of the frame and a preset threshold energy value. The preset threshold energy value can be based on, for instance, an experimentally determined difference in energy between background/silence and actual speech activity. If the energy value of the input frame is below the threshold energy value, endpointer 102 classifies the contents of the frame as background/silence or "non-speech." On the other hand, if the energy value of the input frame is equal to, or greater than, the threshold energy value, endpointer 102 classifies the contents of the frame as actual speech activity. Endpointer 102 would then signal feature extraction module 104 to extract speech characteristics from the frame. A common extracting means for extracting speech characteristics is to determine a feature set such as a cepstral feature set, as is known in the art. The cepstral feature set can then be sent to recognition system 106 which processes the information it receives from feature extraction module 104 in order to "recognize" the speech contained in the input frame.

Referring now to FIG. 2, graph 200 illustrates the endpointing outcome from a conventional endpoint detection system such as endpoint detection system 100 in FIG. 1. In graph 200, the energy of the input speech signal (axis 202) is plotted against the cepstral distance (axis 204). $E_{silence}$ point 206 on axis 202 represents the energy value of background/silence. As an example, $E_{silence}$ can be determined experimentally by measuring the energy value of background/silence or non-speech in different conditions such as in a moving vehicle or in a typical office and averaging the values. $E_{silence}$+K point 208 represents the preset threshold energy value utilized by the endpointer, such as endpointer 102 in FIG. 1, to classify whether an input speech signal contains actual speech activity. The value K therefore represents the difference in the level of energy between background/silence, i.e. $E_{silence}$, and the energy value of what the endpointer is programmed to classify as speech.

It is seen in graph 200 of FIG. 2 that an energy-based algorithm produces an "all-or-nothing" outcome: if the energy of an input frame is below the threshold level, i.e. $E_{silence}$+K, the frame is grouped as part of silence region 210. Conversely, if the energy value of an input frame is equal to or greater than $E_{silence}$+K, it is classified as speech and grouped in speech region 212. Graph 200 shows that the classification of speech utilizing only an energy-based algorithm disregards the spectral characteristics of the speech signal. As a result, a frame which exhibits spectral characteristics similar to actual speech activity may be falsely rejected as non-speech if its energy value is too low. At the same time, a frame which has spectral characteristics very different from actual speech activity may be mistakenly classified as speech simply because it has high energy. It is recalled that with a conventional endpoint detection system such as endpoint detection system 100 in FIG. 1, only frames classified by the endpointer as speech are subsequently exposed to the recognition system for further processing. Thus, when actual speech activity is mistakenly classified by the endpointer as silence or non-speech, or when non-speech activity is erroneously grouped with speech, speech recognition accuracy is significantly diminished.

Another disadvantage of the conventional energy-based endpoint detection algorithm, such as the one utilized by endpoint detection system 100, is that it has little or no immunity to background noise. In the presence of background noise, the conventional endpointer often fails to determine the accurate endpoints of a speech utterance by either (1) missing the leading or trailing low-energy sounds such as fricatives, (2) classifying clicks, pops and background noises as part of speech, or (3) falsely classifying background/silence noise as speech while missing the actual speech. Such errors lead to high false rejection rates, and reflect negatively on the overall performance of the ASR system.

Thus, there is an intense need in the art for a new and improved endpoint detection system that is capable of handling background noise. It is also desired to design the endpoint detection system such that computational requirements are kept to a minimum. It is further desired that the endpoint detection system be able to detect the beginning and end of speech in real time.

SUMMARY OF THE INVENTION

In accordance with the purpose of the present invention as broadly described herein, there is provided for an endpoint detection of speech for improved speech recognition in noisy environments. In one aspect, the background energy of a first portion of a speech signal is determined. Following, one or more features of the first portion is extracted, and the one or more features can be, for example, cepstral vectors. An average distance is thereafter calculated for first portion base on the one or more features extracted. Subsequently, the energy of a second portion of the speech signal is measured, and one or more features of the second portion is extracted. Based on the one or more features of the second portion, a distance is then calculated for the second portion. Thereafter, the energy measured for the second portion is contrasted with the background energy of the first portion, and the distance calculated for the second portion is compared with the distance of the first portion. The second portion of the speech signal is then classified as either speech or non-speech based on the contrast and the comparison.

Moreover, a system for endpoint detection of speech for improved speech recognition in noisy environments can be assembled comprising a cepstral computing module configured to extract one or more features of a first portion of a speech signal and one or more features of a second portion of the speech signal. The system further comprises an energy computing module configured to measure the energy of the second portion. Also, the system comprises an endpointer module configured to determine the background energy of the first portion and to calculate an average distance of the first portion based on the one or more feature of the first portion extracted by the cepstral computing module. The endpointer module can be further configured to calculate a distance of the second portion based on the one or more features of the second portion. In order to classify the second portion as speech or non-speech, the endpointer module is configured to contrast the energy of the second portion with the background energy of the first portion and to compare the distance of the second portion with the average distance of the second portion.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for speech recognition, data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional data transmission, encoding, decoding, signaling and signal processing and other functional and technical aspects of the data communication system and speech recognition (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 3:
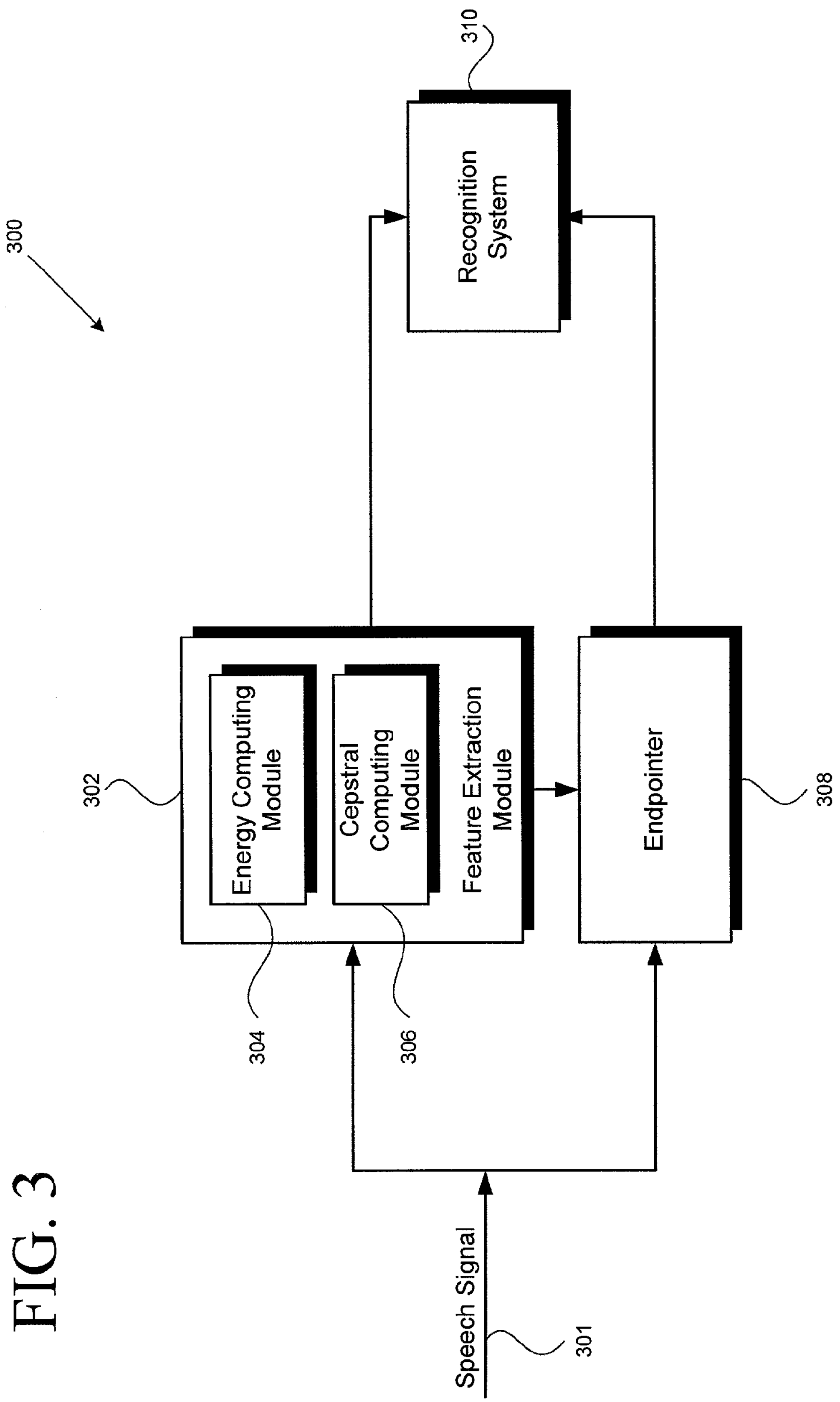
FIG. 3 illustrates a block diagram of an endpoint detection system according to one embodiment of the present invention.

Referring now to FIG. 3, a block diagram of endpoint detection system 300 is illustrated, according to one embodiment of the present invention. Endpoint detection system 300 comprises feature extraction module 302, endpointer 308 and recognition system 310. It is noted that endpointer 308 is also referred to as "endpointer module" 308 in the present application. Feature extraction module 302 further includes energy computing module 304 and cepstral computing module 306. As shown in FIG. 3, speech signal 301 is received by both feature extraction module 302 and endpointer 308. Speech signal 301 can be, for example, an utterance or other speech data received by endpoint detection system 300, typically in digitized form. The signal characteristics of speech signal 301 may vary depending on the type of recording environment and the sources of noise surrounding the signal, as is known in the art. According to the present embodiment, the role of feature extraction module 302 and endpointer 308 is to process speech signal 301 on a frame-by-frame basis in order to endpoint speech signal 301 for actual speech activity.

Continuing with FIG. 3, according to the present embodiment, speech signal 301 is received and processed by both feature extraction module 302 and endpointer 308. As the initial frames of speech signal 301 are received by endpoint detection system 300, feature extraction module 302 and endpointer 308 generate a characterization of the background/silence of speech signal 301 based on the initial frames. In order to characterize the background/silence and continue with the endpointing process, it is desirable to receive the first approximately 100 msec of the speech signal without any speech activity therein. If speech activity is present too soon, then the characterization of the background/silence may not be accurate.

In the present embodiment, as part of the initial characterization of background/silence, endpointer 308 is configured to measure the energy value of the initial frames of the speech signal 301 and, based on that measurement, to determine whether there is speech activity in the first approximately 100 msec of speech signal 301. Depending on the window size of the individual input frames as well as the frame rate, the first approximately 100 msec can be contained in, for example, the first 4, 8 or 10 frames of input speech. As a specific example, given a window size of 30 msec and a frame rate of 20 msec, the characterization of the background/silence may be based on the initial four overlapping frames. It is noted that the frames on which the characterization of background/silence is based are also referred to as the "initial frames" or a "first portion" in the present application. The determination of whether there is speech activity in the initial approximately 100 msec is achieved by measuring the energy values of the initial four frames and comparing them to a predefined threshold energy value. Endpointer 308 can be configured to determine if any of the initial frames contain actual speech activity by comparing the energy value of each of the initial frames to the predefined threshold energy value. If any frame has an energy value higher than the predefined threshold energy value, endpointer 308 would conclude that the frame contains actual speech activity. In one embodiment, the predefined energy threshold is set relatively high such that a determination by endpointer 308 that there is indeed speech activity in the initial approximately 100 msec can be accepted with confidence.

Continuing with the present example, if endpointer 308 determines that there is speech activity within approximately the first 100 msec, i.e. in the initial four frames of speech signal 301, the characterization of the background/silence for the purpose of endpointing speech signal 301 stops. As discussed above, the presence of actual speech activity within the first approximately 100 msec may result in inaccurate characterization of background/silence. Accordingly, if actual speech activity is found in the first approximately 100 msec, it is desirable that the endpointing of the speech signal be halted. In such event, endpoint detection system 300 can be configured to prompt the speaker that the speaker has spoken too soon and to further prompt the speaker to try again. On the other hand, if the energy value of each of the initial four frames as measured by endpointer 308 is below the preset threshold energy value, endpointer 308 may conclude that no speech activity is present in the initial four frames. The initial four frames will then serve as the basis for the characterization of background/silence for speech signal 301.

Continuing with FIG. 3, once endpointer 308 determines that the initial four frames do not contain speech activity, endpointer 308 computes the average background/silence ("$E_{silence}$") for speech signal 301 by averaging the energy across all four frames. It is noted that $E_{silence}$ is also referred to as "background energy" in the present application. As will be explained below, $E_{silence}$ is used to classify subsequent frames of speech signal 301 as either speech or non-speech. Endpointer 308 also signals cepstral computing module 306 of feature extraction module 302 to extract certain speech-related features, or feature sets, from the initial four frames. In most speech recognition systems, these features sets are used to recognize speech by matching them to a set of speech models that are pre-trained on similar features extracted from a training speech data. For example, feature extraction module 302 can be configured to extract cepstral feature sets from speech signal 301 in a manner known in the art. In the present embodiment, cepstral computing module 306 computes a cepstral vector ("$c_j$") for each of the initial four frames. The cepstral vectors for the four frames are used by cepstral computing module 306 to compute a mean cepstral vector ("$C_{mean}$") according to Equation 1, below:

$$C_{mean}(i) = \frac{1}{N_F}\sum_{j=1}^{N_F} c_j(i)$$

where $N_F$ is the number of frames (e.g. $N_F=4$ in the present example), and $c_j(i)$ is the $i^{th}$ cepstral coefficient corresponding to the $j^{th}$ frame. The resulting vector, $C_{mean}$, which is also referred to as "mean distance" in this application, represents the average spectral characteristics of background/silence across the initial four frames of the speech signal.

Once $C_{mean}$ has been determined, cepstral computing module 306 measures the Euclidean distance between each of the four frames of background/silence and the mean cepstral vector, $C_{mean}$. The Euclidean distance is computed by cepstral computing module 306 according to Equation 2, below:

$$d_j = \sum_{i=1}^{p} (c_j(i) - c_{mean}(i))^2$$

where $d_j$ is the Euclidean distance between frame j and the mean cepstral vector $C_{mean}$, P is the order of the cepstral analysis, $c_j(i)$ are the elements of the $j^{th}$ frame cepstral vector, and $c_{mean}(i)$ are the elements of the background/silence mean cepstral vector, $C_{mean}$.

Following the computation of the Euclidean distance between each of the four frames of background/silence and the mean cepstral vector, $C_{mean}$, according to Equation 2 above, cepstral computing module 306 computes the average distance, $D_{silence}$, between the first four frames and the average cepstral vector, $C_{mean}$. Equation 3, below, is used to compute $D_{silence}$:

$$D_{silence} = \frac{1}{N_F}\sum_{k=1}^{N_F} d_j$$

where $D_{silence}$ is the average Euclidean distance between the first four frames and $C_{mean}$, $d_j$ is the Euclidean distance between frame j and the mean cepstral vector, $C_{mean}$, and $N_F$ is the number of frames (e.g. $N_F=4$ in the present example). Thereafter, feature extraction module 302 provides endpointer 308 with its computations, i.e. with the values for $D_{silence}$ and $C_{mean}$. It is noted that $D_{silence}$ is also referred to as "average distance" in the present application.

Following the computation of $E_{silence}$ by endpointer 308, and $D_{silence}$ and $C_{mean}$ by cepstral computing module 306, endpoint detection system 300 proceeds with endpointing the remaining frames of speech signal 301. It is noted that the remaining frames of speech signal 301 are also referred to as a "second portion" in the present application. The remaining frames of speech signal 301 are received sequentially by feature extraction module 302. According to the present embodiment, once the characterization of background/silence has been completed, only two parameters need be computed for each of the subsequent frames in order to determine if it is speech or non-speech.

As shown in FIG. 3, the subsequent frames of speech signal 301 are received by energy computing module 304 and cepstral computing module 306 of feature extraction module 302. It is noted that each such subsequent incoming frame of speech signal 301 is also referred to as "next frame" or "frame k" in the present application. Further, the frames subsequent to the initial frames of the speech signal are also referred to as a "second portion" in the present application. Energy computing module 304 can be configured to compute the frame energy, $E_k$, of each incoming frame of speech signal 301 in a manner known in the art. Cepstral computing module 306 can be configured to compute a simple Euclidean distance, $d_k$, between the current cepstral vector for frame k and the mean cepstral vector $C_{mean}$ according to equation 4 below:

$$d_k = \sum_{i=1}^{p} (c_k(i) - c_{mean}(i))^2$$

where p is the order of the cepstral analysis, $c_k(i)$ are the elements of the current cepstral vector and $c_{mean}(i)$ are the elements of the background mean cepstral vector. After $E_k$ and $d_k$ are computed, feature extraction module 302 sends the information to endpointer 308 for further endpoint processing. It is appreciated that feature extraction module 302 computes $E_k$ and $d_k$ for each frame of speech signal 301 as the frame is received by extraction module 302. In other words, the computations are done "on the fly." Further, endpointer 308 receives the information, i.e. $E_k$ and $d_k$, from feature extraction module 302 on the fly as well.

Continuing with FIG. 3, endpointer 308 uses the information it receives from feature extraction module 302 in order to classify whether a frame of speech signal 301 is speech or non-speech. An input frame is classified as speech, i.e. it has actual speech activity, if it satisfies any one of the following three conditions:

Condition 1: $E_k>\kappa^*E_{silence}$

Condition 2: $d_k>\alpha^*D_{silence}$ and $E_k>\beta^*E_{silence}$

Condition 3: $d_k>D_{silence}$ and $E_k>\eta^*E_{silence}$ where $E_{silence}$ is the mean background/silence computed by endpointer 308 based on the initial approximately 100 msec, e.g. the first four frames, of speech signal 301, $D_{silence}$ is the average Euclidean distance between the first four frames and $C_{mean}$, $d_k$ is the cepstral distance between the "current" frame k and $C_{mean}$, $E_k$ is the energy of the current frame k, and α, β, κ and η are values determined experimentally and incorporated into the present endpointing algorithm. For example, in one embodiment, α can be set at 3, β can be set at 0.75, κ can be set at 1.3, and η can be set at 1.1.

From the three conditions set forth above, i.e. Conditions 1, 2 and 3, it is manifest that endpoint detection system 300 endpoints speech based on various factors in addition to energy. For the energy-based component of the present embodiment, i.e. Condition 1, a preset threshold energy value is attained by adding a predetermined constant value κ to the average silence energy, $E_{silence}$. The value of κ can be determined experimentally and based on an understanding of the difference in energy values for speech versus non-speech. According to Condition 1, an input frame is classified as speech if its energy value, as measured by energy computation module 304, is greater than $\kappa^*E_{silence}$. It is appreciated, however, that in environments where the background noise is high, an endpointer using exclusively an energy-based threshold could erroneously categorize some leading or trailing low-energy sounds such as fricatives as non-speech. Conversely, the endpointer might mistakenly classify high energy sounds such as clicks, pops and sharp noises as speech. At other times, the endpointer might be triggered falsely by noise and completely miss the endpoints of actual speech activity. Accordingly, relying solely on an energy-based endpointing mechanism has many shortcomings.

Thus, in order to overcome such shortcomings associated with endpointing based on energy values alone, the present endpointer considers other parameters. Hence, Conditions 2 and 3 are included to complement Condition 1 and to increase the robustness of the endpointing outcome. Condition 2 ensures that a low-energy sound will be properly classified as speech if it possesses similar spectral characteristics to speech (i.e. if the cepstral distance between the "current" frame and silence, $d_k$, is large). Condition 3 ensures that high energy sounds are classified as speech only if they have similar spectral characteristics to speech.

Continuing with FIG. 3, the data computed by feature extraction module 302 and endpointer 308 can be sent to recognition system 310. In one embodiment, feature extraction 302 only sends recognition system 310 those feature sets corresponding to frames of speech signal 301 which have been determined to contain actual speech activity. The feature sets can be used by speech recognition system 310 for speech recognition processing in a manner known in the art. Thus, endpoint detection system 300 achieves greater endpoint accuracy while keeping computational costs to a minimum by taking advantage of feature sets that would otherwise be computed as part of conventional speech recognition processing and using them for endpointing purposes.

Figure 4:
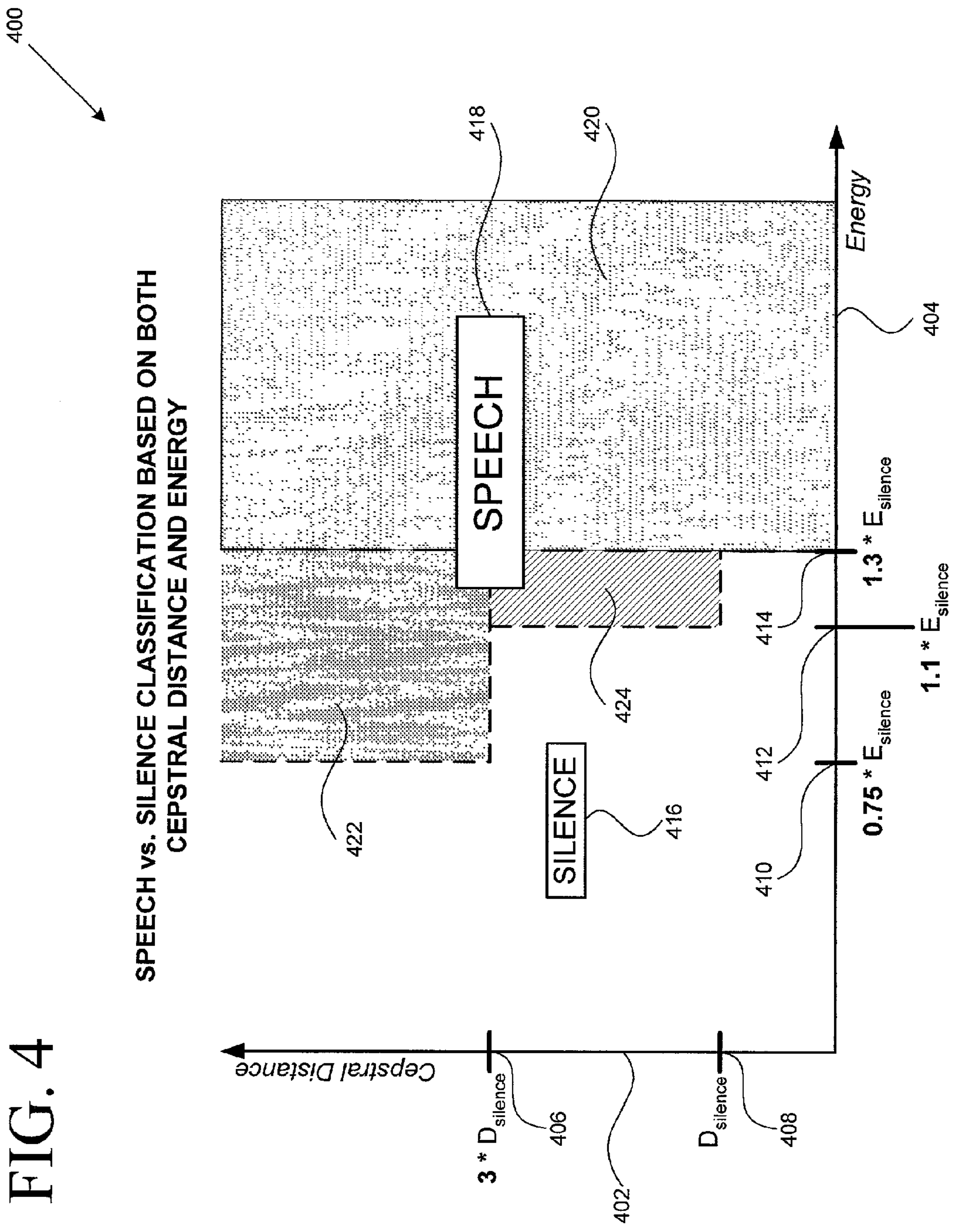
FIG. 4 shows a graph of an endpoint detection utilizing the system of FIG. 3.

Referring now to FIG. 4, graph 400 illustrates the results of endpointing utilizing endpoint detection system 300 of FIG. 3. Graph 400 shows the outcome of an endpoint detection system 300, which classifies speech versus non-speech based on both cepstral distance and energy. More particularly, graph 400 shows how the utilization of Conditions 1, 2 and 3 results in improved endpointing accuracy. In graph 400, energy (axis 404) is plotted against cepstral distance (axis 402). In order to facilitate discussion of graph 400, references will be made to Conditions 1, 2 and 3, wherein a can be set, for example, at 3.0, β can be set at 0.75, κ can be set at 1.30, and η can be set at 1.10. Consequently, point 406 in graph 400 equals $3*D_{silence}$, point 408 equals $D_{silence}$, point 410 equals $0.75*E_{silence}$, point 412 equals $1.1*E_{silence}$ and point 414 equals $1.3*E_{silence}$.

As shown in graph 400, total speech region 418 comprises speech region 420, speech region 422 and speech region 424, while background/silence or "non-speech" is grouped in silence region 416. Speech region 420 includes all frames of an input speech signal, such as speech signal 301, which endpoint detection system 300 determines to satisfy Condition 1. In other words, frames of the speech signal which have energy values that exceed $(1.3*E_{silence})$ would be classified as speech and plotted in speech region 420. Speech region 422 includes the frames of the input speech signal which endpoint detection system 300 determines to satisfy Condition 2, that is those frames which have cepstral distances greater than $(3*D_{silence})$ and energy values greater than $(0.75*E_{silence})$. Speech region 424 includes the frames of the input speech signal which the present endpoint detection system determines to satisfy Condition 3, that is those frames which have cepstral distances greater than $(D_{silence})$ and energy values greater than $(1.1*E_{silence})$. It should be noted that a speech signal may have frames exhibiting characteristics that would satisfy more than one of the three Conditions. For example, a frame may have an energy value that exceeds $(1.3*E_{silence})$ while also having a cepstral distance greater than $(3*D_{silence})$. The combination of high energy and cepstral distance means that the characteristics of this frame would satisfy all three Conditions. Thus, although speech regions 420, 422 and 424 are shown in graph 400 as separate and distinct regions, it is appreciated that certain regions can overlap.

Figure 1:
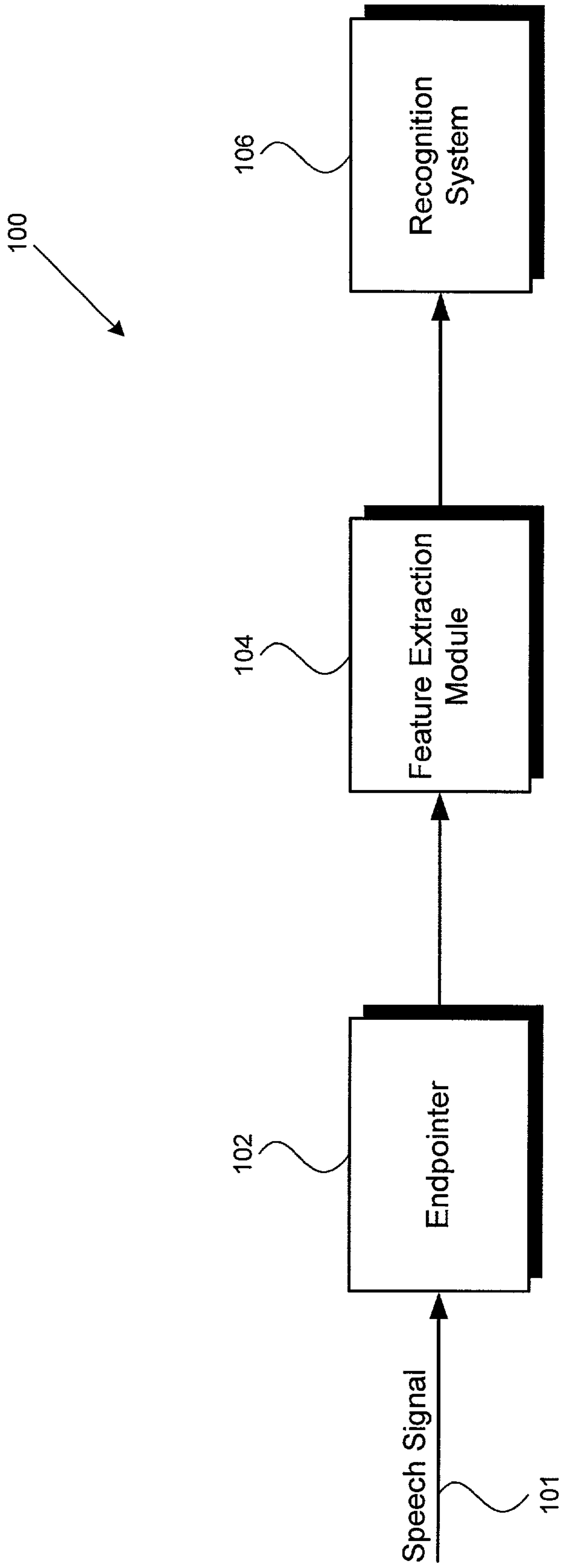
FIG. 1 (Prior Art)
FIG. 1 illustrates a block diagram of a conventional endpoint detection system utilizing an energy-based algorithm.
Figure 2:
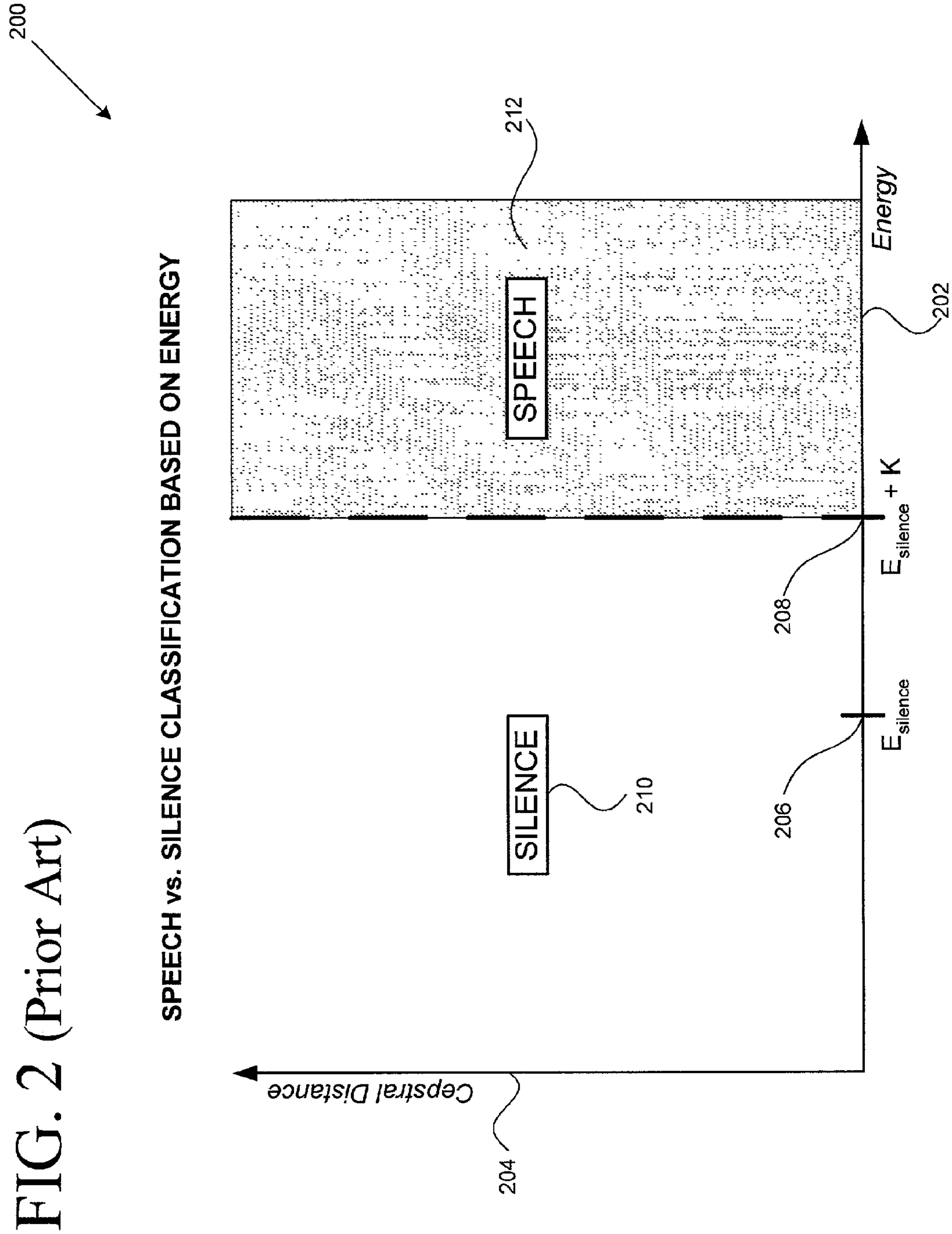
FIG. 2 (Prior Art)
FIG. 2 shows a graph of an endpoint detection utilizing the system of FIG. 1.

The advantages of endpoint detection system 300, which relies on both the energy and the cepstral feature sets of the speech signal to endpoint speech are apparent when graph 400 of FIG. 4 is compared to graph 200 of FIG. 2. It is recalled that graph 200 illustrated the endpointing outcome of a conventional energy-based endpoint detection system. Thus, whereas graph 200 shows an "all-or-nothing" result, graph 400 reveals a more discerning endpointing system. For instance, graph 400 "recaptures" frames of speech activity that would otherwise be classified as background/silence or non-speech by a conventional energy-based endpoint detection system. More specifically, a conventional energy-based endpoint detection system would not classify as speech the frames falling in speech regions 422 and 424 of graph 400.

Figure 5:
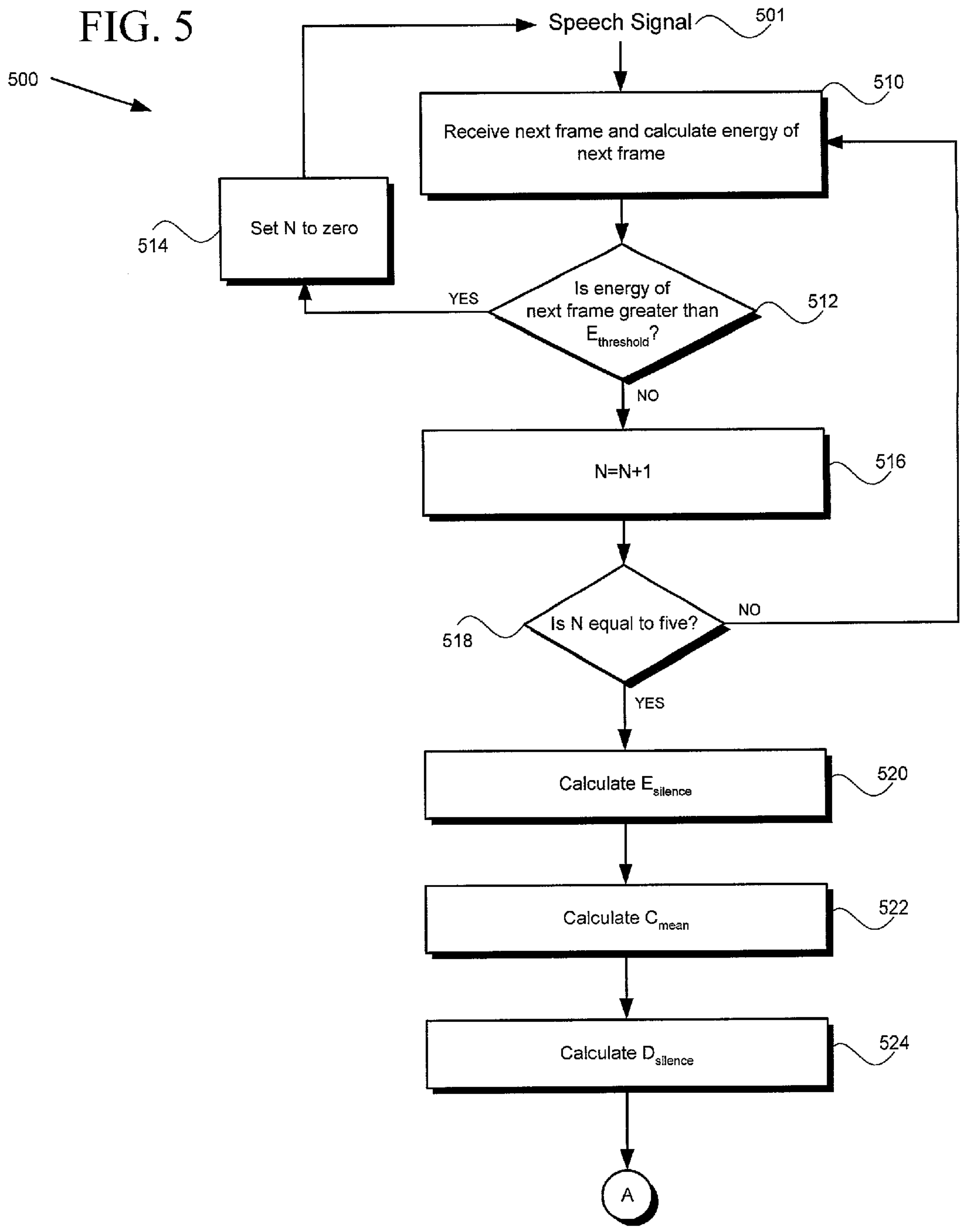
FIG. 5 illustrates a flow diagram of a process for endpointing the beginning of speech according to one embodiment of the present invention.
Figure 5:
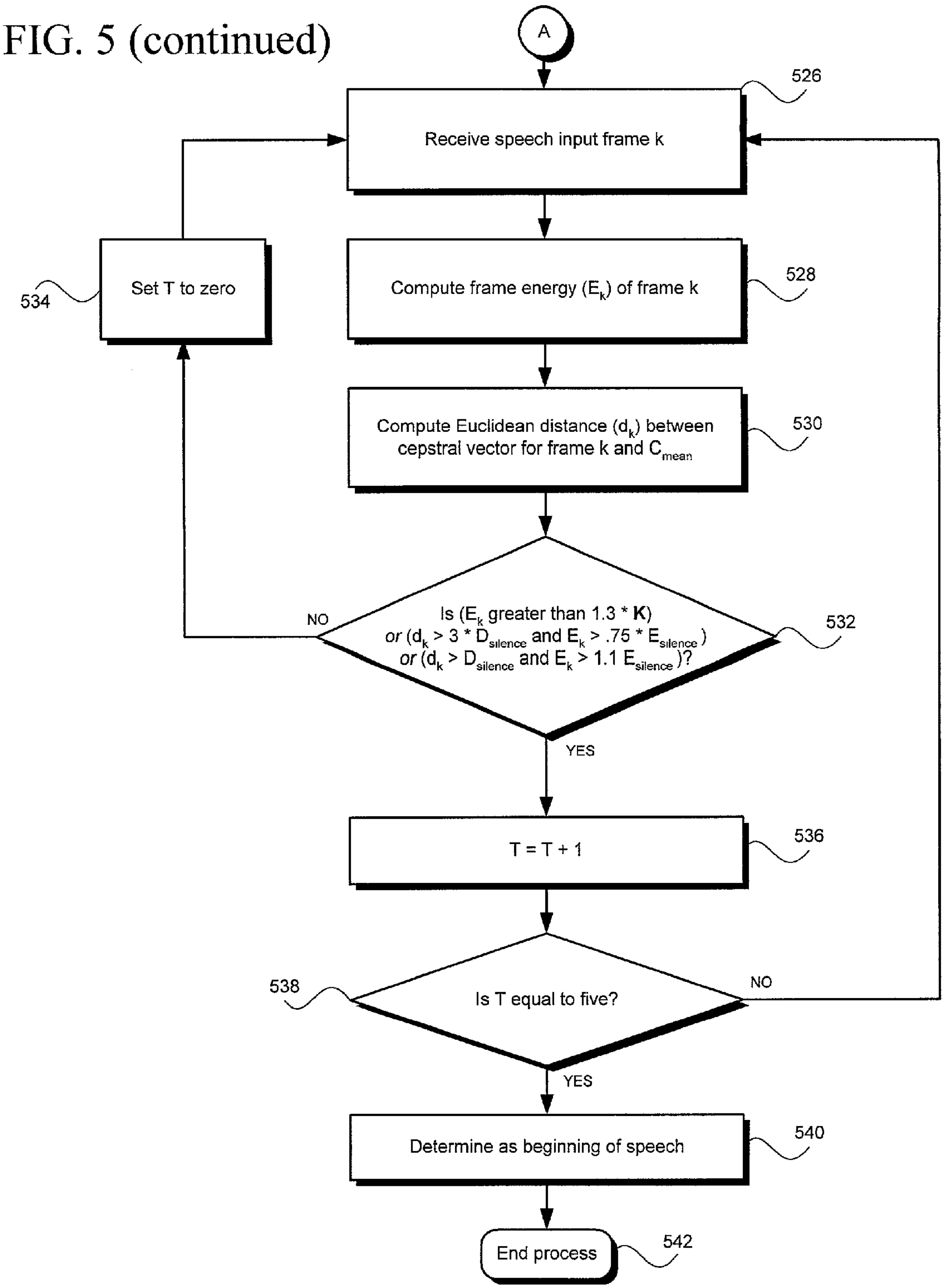

Referring now to FIG. 5, a flow diagram of method 500 for endpointing beginning of speech according to one embodiment of the present invention is illustrated. Although all frames in the present embodiment have a 30 msec frame size with a frame rate of 20 msec, it should be appreciated that other frame sizes and frame rates may be used without departing from the scope and spirit of the present invention.

As shown, method 500 for endpointing the beginning of speech starts at step 510 when speech signal 501, which can correspond, for example, to speech signal 301 of FIG. 3, is received by endpoint detection system 300. More particularly, the first frame of speech signal 501, i.e. "next frame," is received by the system's endpointer, e.g. endpointer 308 in FIG. 3, which measures the energy value of the frame in a manner known in the art. At step 512, the measured energy value of the frame is compared to a preset threshold energy value ("$E_{threshold}$"). $E_{threshold}$ can be established experimentally and based on an understanding of the expected differences in energy values between background/silence and actual speech activity.

If it is determined at step 512 that the energy value of the frame is equal to or greater than $E_{threshold}$, the endpointer classifies the frame as speech. The process then proceeds to step 514 where counter variable N is set to zero. Counter variable N tracks the number of frames initially received by the endpoint detection system, which does not exceed $E_{threshold}$. Thus, when a frame energy exceeds $E_{threshold}$, counter variable N is set to zero and the speaker is notified that the speaker has spoken too soon. Because the first five frames of the speech signal (or first 100 msec, given a 30 msec window size and a 20 msec frame rate) will be used to characterize background/silence, it is preferred that there be no actual speech activity in the first five frames. Thus, if the endpointer determines that there is actual speech activity in the first five frames, endpointing of speech signal 501 halts, and the process returns to the beginning to where a new speech signal can be received.

If it is determined at step 512 that the energy value of the received frame, i.e. next frame, is less that $E_{threshold}$, method 500 proceeds to step 516 where counter variable N is incremented by 1. At step 518, it is determined whether counter variable N is equal to five, i.e. whether 100 msec of speech input have been received without actual speech activity. If counter variable N is less than 5, method 500 for endpointing the beginning of speech returns to step 510 where the next frame of speech signal 501 is received by the endpointer.

If it is determined at step 518 that counter variable N is equal to 5, then method 500 for endpointing the beginning of speech proceeds to step 520 where $E_{silence}$ is computed by averaging the energy across all five frames received by the endpointer. $E_{silence}$ represents the average background/silence of speech signal 501 and is computed by averaging the energy values of the five frames. Following, at step 522, the endpointer signals the feature extraction module, e.g. feature extraction module 302 of FIG. 3, to calculate $C_{mean}$, which represents the average spectral characteristics of background/silence of the five frames received by the endpoint detection system. As discussed above in relation to FIG. 3, $C_{mean}$ is computed according to Equation 1 shown above. At step 524, $D_{silence}$ is computed according to Equations 2 and 3 shown above, wherein $N_F$ is equal to five. $D_{silence}$ represents the average distance between the first five frames and the average cepstral vector representing background characteristics, $C_{mean}$.

Once $E_{silence}$, $C_{mean}$ and $D_{silence}$ have been computed in steps 520, 522 and 524, respectively, method 500 for endpointing the beginning of speech proceeds to step 526. At step 526, endpoint detection system 300 receives the following frame ("frame k") of speech signal 501. Method 500 then proceeds to step 528 where the frame energy of frame k ("$E_k$") is computed. Computation of $E_k$ is done in a manner well known in the art. Following, at step 530, the Euclidean distance ("$d_k$") between the cepstral vector for frame k and $C_{mean}$ is computed. Euclidean distance $d_k$ is computed according to Equation 4 shown above.

Next, method 500 for endpointing the beginning of speech proceeds to step 532 where the characteristics of frame k, i.e. $E_k$ and $d_k$, are utilized to determine whether frame k should be classified as speech or non-speech. More particularly, at step 532, it is determined whether frame k satisfies any of three conditions utilized by the present endpoint detection system to classify input frames as speech or non-speech. These three conditions are shown above as Conditions 1, 2 and 3. If frame k does not satisfy any of the three Conditions 1, 2 or 3, i.e. if frame k is non-speech, the process proceeds to step 534 where counter variable T is set to zero. Counter variable T tracks the number of consecutive frames containing actual speech activity, i.e. the number of consecutive frames satisfying, at step 532, at least one of the three Conditions 1, 2 or 3. Method 500 for endpointing the beginning of speech then returns to step 526, where the next frame of speech signal 501 is received.

If it is determined, at step 532, that frame k satisfies at least one of the three Conditions 1, 2 or 3, then method 500 for endpointing the beginning of speech continues to step 536, where counter variable T is incremented by one. Next, at step 538, it is determined whether counter variable T is equal to five. If counter variable T is not equal to five, method 500 for endpointing the beginning of speech returns to step 526 where the next frame of speech signal 501 is received by the endpoint detection system. On the other hand, if it is determined, at step 538, that counter variable T is equal to five, it indicates that the endpointer has classified five consecutive frames, i.e. 100 msec, of speech signal 501 as having actual speech activity. Method 500 for endpointing the beginning of speech would then proceed to step 540, where the endpointer declares that the beginning of speech has been found. In one embodiment, the endpointer may be configured to "go back" approximately 100–200 msec of input speech signal 501 to ensure that no actual speech activity is bypassed. The endpointer can then signal the recognition component of the speech recognition system to begin "recognizing" the incoming speech. After the beginning of speech has been declared at step 540, method 500 for endpointing the beginning of speech ends at step 542.

Figure 6:
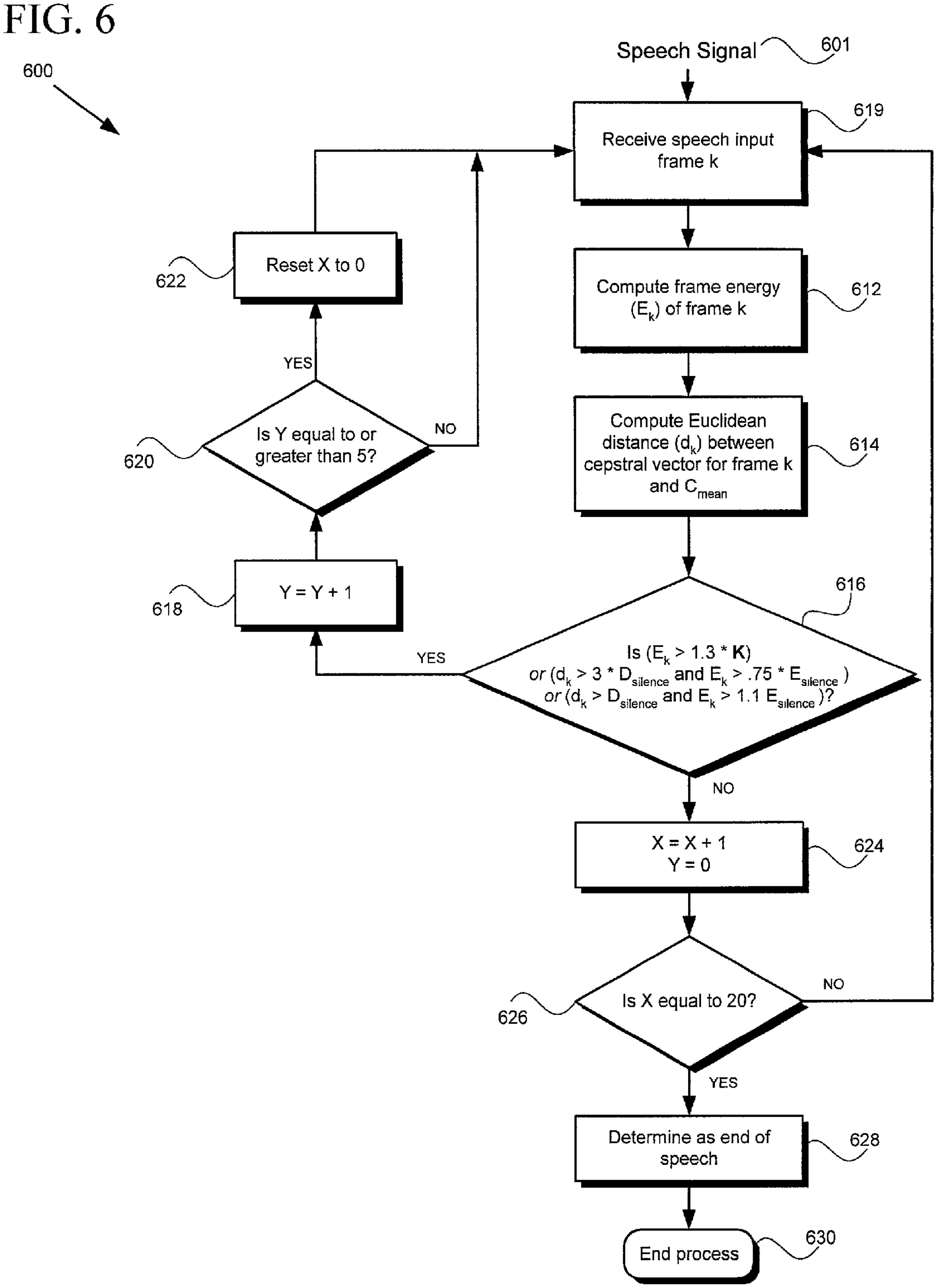
FIG. 6 illustrates a flow diagram of a process for endpointing the end of speech according to one embodiment of the present invention.

Referring now to FIG. 6, a flow diagram of method 600 for endpointing the end of speech, according to one embodiment of the present invention is illustrated. Method 600 for endpointing the end of speech begins at step 610, where endpoint detection system 300 receives frame k of speech signal 601. Speech signal 601 can correspond to, for example, speech signal 301 of FIG. 3 and speech signal 501 of FIG. 5. It is noted that prior to step 610, the beginning of actual speech activity in speech signal 601 has already been declared by the endpointer. Thus, method 600 for endpointing the end of speech is directed towards determining when the speech activity in speech signal 601 ends. Thus, frame k here represents the next frame received by the endpoint detection system following the declaration of beginning of speech.

Once frame k has been received at step 610, method 600 for endpointing the end of speech proceeds to step 612, where endpointer 308 measures the energy of frame k ("$E_k$") in a manner known in the art. Following, at step 614, the Euclidean distance ("$d_k$") between the cepstral vector for frame k and $C_{mean}$ is computed. Euclidean distance $d_k$ is computed according to Equation 4 shown above, while $C_{mean}$, which represents the average spectral characteristics of background/silence of speech signal 601, is computed according to Equation 1 shown above.

Next, method 600 for endpointing the end of speech proceeds to step 616 where the characteristics of frame k, i.e. $E_k$ and $d_k$, are utilized to determine whether frame k should be classified as speech or non-speech. More particularly, at step 616, it is determined whether frame k satisfies any of three conditions utilized by the present endpoint detection system to classify input frames as speech or non-speech. These three conditions are shown above as Conditions 1, 2 and 3. If frame k satisfies any of the three Conditions 1, 2 or 3, i.e. the endpointer determines that frame k contains actual speech activity, the process proceeds to step 618 where counter variable X and counter variable Y are each incremented by one. Counter variable X tracks a count of the number of frames of speech signal 601 that have been classified as silence without encountering at least five consecutive frames classified as speech. Counter variable Y tracks the number of consecutive frames classified as speech, i.e. the number of consecutive frames that satisfy any of the three Conditions 1, 2 or 3.

After counter variable Y has been incremented at step 618, method 600 for endpointing the end of speech proceeds to step 620 where it is determined whether counter variable Y is equal to or greater than five. Since counter variable Y represents the number of consecutive frames classified as speech, determining at step 620 that counter variable Y is equal to or greater than five would indicate that at least 100 msec of actual speech activity have been consecutively classified. In such event, method 600 proceeds to step 622 where counter variable X is reset to zero. If it is instead determined, at step 620, that counter variable Y is less than five, method 600 returns to step 610 where the next frame of speech signal 601 is received and processed.

Referring again to step 616 of method 600 for endpointing the end of speech, if it is determined at step 616 that the characteristics of frame k, i.e. $E_k$ and $d_k$, do not satisfy any of the three Conditions 1, 2 or 3, then the endpointer can classify frame k as non-speech. Method 600 then proceeds to step 624 where counter variable X is incremented by one, and counter variable Y is reset to zero. Counter variable Y is reset to zero because a non-speech frame has been classified.

Next, method 600 for endpointing the end of speech proceeds to step 626, where it is determined whether counter variable X is equal to 20. According to the present embodiment, counter variable X equaling 20 indicates that the endpoint detection system has processed 20 frames or 400 msec of speech signal 601 without classifying consecutively at least 5 frames or 100 msec of actual speech activity. In other words, 400 consecutive milliseconds of speech signal 601 have been endpointed without encountering 100 consecutive milliseconds of speech activity. Thus, if it is determined at step 626 that counter variable X is less than 20, then method 600 returns to step 610, where the next frame of speech signal 601 can be received and endpointed. However, if it is determined instead that counter variable X is equal to 20, method 600 for endpointing the end of speech proceeds to step 628 where the endpointer can declare that the end of speech for speech signal 601 has been found. In one embodiment, the endpointer may be configured to "go back" approximately 100–200 msec of input speech signal 601 and declare that speech actually ended approximately 100–200 msec prior to the current frame k. After end of speech has been declared at step 628, method 600 for endpointing the end of speech ends at step 630.

As described above in connection with some embodiments, the present invention overcomes many shortcomings of conventional approaches and has many advantages. For example, the present invention improves endpointing by relying on more than just the energy of the speech signal. More particularly, the spectral characteristics of the speech signal is taken into account, resulting in a more discerning endpointing mechanism. Further, because the characterization of background/silence is computed for each new input speech signal rather than being preset, greater endpointing accuracy is achieved. The characterization of background/silence for each input speech signal also translates to better handling of background noise, since the environmental conditions in which the speech signal is recorded are taken into account. Additionally, by using a readily available feature set, e.g. the cepstral feature set, the present invention is able to achieve improvements in endpointing speech with relatively low computational costs. Even more, the advantages of the present invention are accomplished in real-time.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A method for endpointing a speech signal, said method comprising steps of:

determining a background energy (Esilence) of a first portion of said speech signal;

extracting one or more features of said first portion;

calculating an average distance (Dsilence) of said first portion based on said one or more features of said first portion;

measuring an energy (Ek) of a second portion of said speech signal;

extracting one or more features of said second portion;

calculating a first distance (dk) of said second portion of said speech signal based on said one or more features of said second portion;

classifying said second portion as speech if (Ek>κ*Esilence) is true; and classifying said second portion as speech if (Ek>κ*Esilence) is false and if ((dk>α*Dsilence and Ek>β*Esilence) or (dk>Dsilence and Ek>η*Esilence)) is true;

wherein α, β, η and κ are real values, and wherein κ>η>β and α>1.

2. The method of claim 1 wherein κ is about 1.30.

3. The method of claim 1 wherein β is about 0.75 and α is about 3.0.

4. The method of claim 1 wherein η is about 1.10.

5. The method of claim 1 wherein said first portion comprises approximately 100 msec of said speech signal.

6. The method of claim 1 wherein said one or more features of said first portion comprises a plurality of cepstral vectors.

7. The method of claim 1 wherein said one or more features of said second portion comprises a plurality of cepstral vectors.

8. The method of claim 1 further comprising a step of declaring a beginning of speech activity after said classifying step classifies 100 consecutive msec of said second portion as speech.

9. The method of claim 1 further comprising steps of:

measuring a plurality of energy values of said first portion;

comparing said plurality of energy values to a threshold energy value prior to said step of determining said background energy.

10. A system for endpointing a speech signal, said system comprising:

a cepstral computing module configured to extract one or more features of a first portion of said speech signal and extract one or more features of a second portion of said speech signal;

an energy computing module configured to measure an energy (Ek) of a second portion of said speech signal;

an endpointer module configured to determine a background energy (Esilence) of said first portion, calculate an average distance (Dsilence) of said first portion based on said one or more features of said first portion and calculate a first distance (dk) of said second portion based on said one or more features of said second portion;

wherein said second portion is classified as speech if (Ek>κ*Esilence) is true, and wherein said second speech is classified as speech if(Ek>κ*Esilence) is false and if ((dk>α*Dsilence and Ek>β*Esilence) or (dk>Dsilence and Ek>η*Esilence)) is true, wherein α, β, η, and κ are real values, and wherein κ>η>β and α>1.

11. The system of claim 10 wherein κ is about 1.30.

12. The system of claim 10 wherein β is about 0.75 and α is about 3.0.

13. The system of claim 10 wherein η is about 1.10.

14. The system of claim 10 wherein said first portion comprises approximately 100 msec of said speech signal.

15. The system of claim 10 wherein said one or more features of said first portion comprises a plurality of cepstral vectors.

16. The system of claim 10 wherein said one or more features of said second portion comprises a plurality of cepstral vectors.

17. The system of claim 10 wherein said endpointer module is further configured to declare a beginning of speech activity after said endpointer module classifies 100 consecutive msec of said second portion as speech.

18. A method for endpointing a speech signal, said method comprising steps of:

determining a background energy of a first portion of said speech signal;

extracting one or more features of said first portion;

calculating an average distance of said first portion based on said one or more features of said first portion;

measuring an energy of a second portion of said speech signal;

extracting one or more features of said second portion;

calculating a first distance of said second portion of said speech signal based on said one or more features of said second portion;

contrasting said energy of said second portion with said background energy of said first portion;

comparing said first distance of said second portion with said average distance of said first portion;

classifying said second portion as speech or non-speech based said step of contrasting and said step of comparing;

wherein said classifying step classifies said second portion of said speech signal as speech if said step of contrasting determines that said energy of said second portion is greater than said background energy of said first portion multiplied by a constant, wherein said constant is about 1.30.

19. A method for endpointing a speech signal, said method comprising steps of:

determining a background energy of a first portion of said speech signal;

extracting one or more features of said first portion;
calculating an average distance of said first portion based on said one or more features of said first portion;
measuring an energy of a second portion of said speech signal;
extracting one or more features of said second portion;
calculating a first distance of said second portion of said speech signal based on said one or more features of said second portion;
contrasting said energy of said second portion with said background energy of said first portion;
comparing said first distance of said second portion with said average distance of said first portion;
classifying said second portion as speech or non-speech based said step of contrasting and said step of comparing;
wherein said classifying step classifies said second portion of said speech signal as speech if said step of contrasting determines that said energy of said second portion is greater than said background energy of said first portion multiplied by a first constant and said step of comparing determines that said first distance of said second portion is greater than said average distance of said first portion multiplied by a second constant, wherein said first constant is about 0.75 and said second constant is about 3.0.

20. A method for endpointing a speech signal, said method comprising steps of:
determining a background energy of a first portion of said speech signal;
extracting one or more features of said first portion;
calculating an average distance of said first portion based on said one or more features of said first portion;
measuring an energy of a second portion of said speech signal;
extracting one or more features of said second portion;
calculating a first distance of said second portion of said speech signal based on said one or more features of said second portion;
contrasting said energy of said second portion with said background energy of said first portion;
comparing said first distance of said second portion with said average distance of said first portion;
classifying said second portion as speech or non-speech based said step of contrasting and said step of comparing;
wherein said classifying step classifies said second portion of said speech signal as speech if said step of contrasting determines that said energy of said second portion is greater than said background energy of said first portion multiplied by a constant and said step of comparing determines that said first distance of said second portion is greater than said average distance of said first portion, wherein said constant is about 1.10.

21. A system for endpointing a speech signal, said system comprising:
a cepstral computing module configured to extract one or more features of a first portion of said speech signal and extract one or more features of a second portion of said speech signal;
an energy computing module configured to measure an energy of a second portion of said speech signal;
an endpointer module configured to determine a background energy of said first portion, calculate an average distance of said first portion based on said one or more features of said first portion and calculate a first distance of said second portion based on said one or more features of said second portion;
wherein said second portion is classified as speech or non-speech by contrasting said energy of said second portion with said background energy of said first portion and by comparing said distance of said second portion with said average distance of said first portion;
wherein said endpointer module classifies said second portion of said speech signal as speech if said energy of said second portion is greater than said background energy of said first portion multiplied by a constant, wherein said constant is about 1.30.

22. A system for endpointing a speech signal, said system comprising:
a cepstral computing module configured to extract one or more features of a first portion of said speech signal and extract one or more features of a second portion of said speech signal;
an energy computing module configured to measure an energy of a second portion of said speech signal;
an endpointer module configured to determine a background energy of said first portion, calculate an average distance of said first portion based on said one or more features of said first portion and calculate a first distance of said second portion based on said one or more features of said second portion;
wherein said second portion is classified as speech or non-speech by contrasting said energy of said second portion with said background energy of said first portion and by comparing said distance of said second portion with said average distance of said first portion;
wherein said endpointer module classifies said second portion of said speech signal as speech if said energy of said second portion is greater than said background energy of said first portion multiplied by a first constant and said first distance of said second portion is greater than said average distance of said first portion multiplied by a second constant, wherein said first constant is about 0.75 and said second constant is about 3.0.

23. A system for endpointing a speech signal, said system comprising:
a cepstral computing module configured to extract one or more features of a first portion of said speech signal and extract one or more features of a second portion of said speech signal;
an energy computing module configured to measure an energy of a second portion of said speech signal;
an endpointer module configured to determine a background energy of said first portion, calculate an average distance of said first portion based on said one or more features of said first portion and calculate a first distance of said second portion based on said one or more features of said second portion;
wherein said second portion is classified as speech or non-speech by contrasting said energy of said second portion with said background energy of said first portion and by comparing said distance of said second portion with said average distance of said first portion;
wherein said endpointer module classifies said second portion of said speech signal as speech if said energy of said second portion is greater than said background energy of said first portion multiplied by a constant and said first distance of said second portion is greater than said average distance of said first portion, wherein said constant is about 1.10.

24. A method for endpointing a speech signal, said method comprising steps of:

determining a background energy (Esilence) of a first portion of said speech signal;

extracting one or more features of said first portion;

calculating an average distance (Dsilence) of said first portion based on said one or more features of said first portion;

measuring an energy (Ek) of a second portion of said speech signal;

extracting one or more features of said second portion;

calculating a first distance (dk) of said second portion of said speech signal based on said one or more features of said second portion;

classifying said second portion as speech if ($dk>\alpha*Dsilence$ and $Ek>\beta*Esilence$) is true; and classifying said second portion as speech if ($dk>\alpha*Dsilence$ and $Ek>\beta*Esilence$) is false and if (($Ek>\kappa*Esilence$) or ($dk>Dsilence$ and $Ek>\eta*Esilence$)) is true;

wherein $\alpha$, $\beta$, $\eta$, and $\kappa$ are real values, and wherein $\kappa>\eta>\beta$ and $\alpha>1$.

25. A method for endpointing a speech signal, said method comprising steps of:

determining a background energy (Esilence) of a first portion of said speech signal;

extracting one or more features of said first portion;

calculating an average distance (Dsilence) of said first portion based on said one or more features of said first portion;

measuring an energy (Ek) of a second portion of said speech signal;

extracting one or more features of said second portion;

calculating a first distance (dk) of said second portion of said speech signal based on said one or more features of said second portion;

classifying said second portion as speech if ($dk>Dsilence$ and $Ek>\eta*Esilence$) is true; and classifying said second portion as speech if ($dk>Dsilence$ and $Ek>\eta*Esilence$) is false and if (($Ek>\kappa*Esilence$) or ($dk>\alpha*Dsilence$ and $Ek>\beta*Esilence$)) is true;

wherein $\alpha$, $\beta$, $\eta$, and $\kappa$ are real values, and wherein $\kappa>\eta>\beta$ and $\alpha>1$.

* * * * *